(12) United States Patent
Smiley

(10) Patent No.: US 11,805,878 B2
(45) Date of Patent: Nov. 7, 2023

(54) PERSONAL ITEM SECURITY TETHER AND FASTENING ASSEMBLY

(71) Applicant: Safe N Secure Industries, LLC, Valrico, FL (US)

(72) Inventor: Gary Smiley, Valrico, FL (US)

(73) Assignee: SAFE N SECURE INDUSTRIES, LLC, Valrico, FL (US)

( * ) Notice: Subject to any disclaimer, the term of this patent is extended or adjusted under 35 U.S.C. 154(b) by 0 days.

(21) Appl. No.: 17/639,537

(22) PCT Filed: Sep. 11, 2020

(86) PCT No.: PCT/US2020/050571
§ 371 (c)(1),
(2) Date: Mar. 1, 2022

(87) PCT Pub. No.: WO2021/051008
PCT Pub. Date: Mar. 18, 2021

(65) Prior Publication Data
US 2022/0312922 A1    Oct. 6, 2022

Related U.S. Application Data

(60) Provisional application No. 62/898,942, filed on Sep. 11, 2019.

(51) Int. Cl.
*F16B 45/02* (2006.01)
*A45C 13/20* (2006.01)

(52) U.S. Cl.
CPC ............ *A45C 13/20* (2013.01); *F16B 45/023* (2021.05); *F16B 45/037* (2021.05); *F16B 2200/83* (2023.08)

(58) Field of Classification Search
CPC ....... A45C 13/20; F16B 45/037; F16B 45/023
See application file for complete search history.

(56) References Cited

U.S. PATENT DOCUMENTS

| | | | | |
|---|---|---|---|---|
| 1,420,949 A | * | 6/1922 | Schindler | B60C 27/08 24/598.5 |
| 1,855,345 A | * | 4/1932 | Fischer, Jr. | A43C 11/22 D2/978 |
| 1,871,066 A | * | 8/1932 | Lubell | A41F 11/16 24/265 R |
| 3,129,477 A | * | 4/1964 | Mizuno | A44C 5/2076 24/303 |
| 3,137,863 A | * | 6/1964 | Dimpfl | A41D 1/06 2/232 |

(Continued)

FOREIGN PATENT DOCUMENTS

ES    1158189 U    6/2016

*Primary Examiner* — Jason W San
(74) *Attorney, Agent, or Firm* — Mark C. Johnson; Johnson Dalal

(57) ABSTRACT

Two rigid fasteners each with integrally coupled magnets of opposing polarity on an outer surface thereon. The rigid fasteners also each have a spring-loaded displaceable clip member rotatably coupled thereto, wherein the clip member is operably configured to open and close to provide access to an aperture defined by the rigid fasteners. The fasteners are coupled together with a tether member also of a rigid material, wherein the fasteners are configured to selectively couple and uncouple together with the magnets thereon.

9 Claims, 4 Drawing Sheets

(56) References Cited

U.S. PATENT DOCUMENTS

| | | | | |
|---|---|---|---|---|
| 5,615,454 A * | 4/1997 | Contarino | | A45C 13/20 |
| | | | | 24/3.13 |
| 6,962,315 B2 * | 11/2005 | Lee | | B43L 3/00 |
| | | | | 248/316.1 |
| 7,793,518 B1 * | 9/2010 | Holleman | | A41F 19/00 |
| | | | | 63/3.1 |
| 8,555,470 B2 * | 10/2013 | Spataro | | F16B 45/02 |
| | | | | 24/600.1 |
| 9,032,594 B1 * | 5/2015 | Mitchell | | H01F 7/0263 |
| | | | | 24/601.5 |
| 9,078,510 B2 * | 7/2015 | Liao | | A45F 5/10 |
| 9,080,595 B1 * | 7/2015 | Mitchell | | A44C 5/2038 |
| 9,433,248 B2 * | 9/2016 | Bellak | | A41D 17/02 |
| 9,499,318 B2 * | 11/2016 | Mohika | | A61M 25/09 |
| D775,517 S * | 1/2017 | Votel | | D8/382 |
| 9,777,763 B2 * | 10/2017 | Mitchell | | F16B 45/02 |
| 10,495,134 B1 * | 12/2019 | Crawford | | A47G 7/045 |
| 11,190,228 B1 * | 11/2021 | Macias | | A45C 11/00 |
| 11,433,263 B1 * | 9/2022 | Bishop | | A62B 35/0037 |
| 2003/0075578 A1 | 4/2003 | Abelow | | |
| 2005/0283953 A1 * | 12/2005 | Jeffrey | | A47K 10/14 |
| | | | | 24/303 |
| 2006/0174649 A1 * | 8/2006 | Azrielant | | A44C 7/00 |
| | | | | 63/14.1 |
| 2008/0250615 A1 * | 10/2008 | Emenheiser | | F16B 45/02 |
| | | | | 24/599.6 |
| 2011/0047764 A1 * | 3/2011 | Strasser | | F16B 45/021 |
| | | | | 24/599.5 |
| 2012/0060332 A1 * | 3/2012 | Mitchell | | H01F 7/0263 |
| | | | | 24/592.1 |
| 2012/0324710 A1 * | 12/2012 | Panopoulos | | A41F 1/00 |
| | | | | 24/499 |
| 2013/0299540 A1 * | 11/2013 | Avganim | | E05B 73/0005 |
| | | | | 224/600 |
| 2013/0313292 A1 * | 11/2013 | Alley | | A47J 25/48 |
| | | | | 223/85 |
| 2014/0110956 A1 * | 4/2014 | Lin | | B66C 1/36 |
| | | | | 294/82.2 |
| 2014/0116099 A1 * | 5/2014 | Romero Pedret | | A45C 13/02 |
| | | | | 70/64 |
| 2014/0127970 A1 * | 5/2014 | Dionne | | A41F 19/00 |
| | | | | 450/88 |
| 2014/0250640 A1 * | 9/2014 | Crooks | | A41F 19/00 |
| | | | | 24/303 |
| 2014/0283565 A1 * | 9/2014 | Edwards | | A45C 13/20 |
| | | | | 70/2 |
| 2015/0047154 A1 * | 2/2015 | DeBien | | F16B 45/02 |
| | | | | 24/303 |
| 2015/0322996 A1 * | 11/2015 | Mitchell | | F16B 45/02 |
| | | | | 24/303 |
| 2015/0335084 A1 * | 11/2015 | Ditnes | | A41F 17/02 |
| | | | | 24/507 |
| 2016/0017912 A1 * | 1/2016 | Jang | | A01K 75/00 |
| | | | | 24/599.5 |
| 2017/0282781 A1 * | 10/2017 | Christiansen, Jr. | | B60P 7/0823 |
| 2019/0124891 A1 * | 5/2019 | Swinton | | A45C 11/24 |
| 2019/0360518 A1 * | 11/2019 | Crawford | | F16B 1/00 |
| 2022/0006892 A1 * | 1/2022 | Perkins | | G06K 19/0702 |
| 2022/0361454 A1 * | 11/2022 | Phillips | | A01K 27/004 |

* cited by examiner

PERSONAL ITEM SECURITY TETHER AND FASTENING ASSEMBLY

FIELD OF THE INVENTION

The present invention relates generally to portable security tethering device, and, more particularly, relates to tethering device that can be selectively attached and removed from objects or items.

BACKGROUND OF THE INVENTION

Security for portable personal belongings (e.g., purses, backpacks, etc.) is an area of concern for many individuals. This concern is generally heighted for disabled individuals, elderly individuals, individuals that desire to temporarily leave their personal belongings behind, or individuals that are unable to defend against personal attacks or theft involving their portable personal belongings. Attempting to address those concerns, some known methods and devices include tracking the personal belongings, which is often a cost- and time-intensive process.

Some known methods and devices utilize tethering devices selectively attachable to an object and a user's personal belonging, but not in an effective, efficient, or safe manner. For example, some ends of the tether are unable to effectively surround a portion of the user's personal belonging, thereby increasing the likelihood of the personal belonging being removed. Additionally, the ends of known tethering security devices are prone to causing damage to the user's personal belonging or are not quickly and efficiently lockable with respect to the user's personal belonging. Further, many known tethering security devices are heavy and cumbersome, thereby reducing the likelihood that users will want to transport the device and otherwise causing inconvenience to users.

SUMMARY OF THE INVENTION

The invention provides a personal item security tether and fastening assembly that overcomes the hereinafore-mentioned disadvantages of the heretofore-known devices and methods of this general type and that enables quick, effective, and safe coupling, removal, transportation, and storage of the said personal item security tether and fastening assembly.

With the foregoing and other objects in view, there is provided, in accordance with the invention, a personal item security tether and fastening assembly with a first fastener with a sidewall of a rigid material and having an outer sidewall surface at least partially defined by an outer surface of a magnet of a first polarity and integrally coupled to and within the sidewall of the first fastener and an inner sidewall surface opposing the outer sidewall surface, and a spring-loaded displaceable clip member rotatably coupled to the sidewall of the first fastener and operably configured to completely enclose, with the sidewall of the first fastener, a first retention aperture. The assembly also includes second fastener with a sidewall of a rigid material and having an outer sidewall surface at least partially defined by an outer surface of a magnet of a second polarity opposite the first polarity of the magnet coupled to the first fastener and integrally coupled to and within the sidewall of the second fastener and an inner sidewall surface opposing the outer sidewall surface, and a spring-loaded displaceable clip member rotatably coupled to the sidewall of the second fastener and operably configured to completely enclose, with the sidewall of the second fastener, a second retention aperture. The assembly also includes a tether member of a rigid material, with a first terminal end fixedly coupled to the first fastener, and with a second terminal end, opposing the first terminal end, fixedly coupled to the second fastener.

In accordance with another feature, an embodiment of the present invention includes the magnets each having two opposing terminal ends and a magnet length separating the two opposing terminal ends, wherein the outer surfaces of the magnets are substantially planar.

In accordance with a further feature of the present invention, the outer surfaces of the magnets are coupled to the respective first and second fasteners are flush with the outer sidewall surfaces of the respective first and second fasteners to which they are coupled.

In accordance with another feature of the present invention, the first and second fasteners each have a length separating two opposing ends of the first and second fasteners, respectively, wherein the outer surfaces of the magnets coupled to the respective first and second fasteners is at least 50% of the length separating two opposing ends of the first and second fasteners, respectively.

In accordance with yet another feature of the present invention, the magnets are respectively disposed on a single side of the first and second fasteners.

In accordance with a further feature of the present invention, the rigid tether member is comprised of steel chain.

In accordance with an additional feature of the present invention, the rigid tether member is less than 12 inches.

Although the invention is illustrated and described herein as embodied in a personal item security tether and fastener, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

Other features that are considered as characteristic for the invention are set forth in the appended claims. It is to be understood that the disclosed embodiments herein are merely exemplary of the invention, which can be embodied in various forms. Therefore, specific structural and functional details disclosed herein are not to be interpreted as limiting, but merely as a basis for future claims and as a representative basis for teaching one of ordinary skill in the art to variously employ the present invention in virtually any appropriately detailed structure. Further, the terms and phrases used herein are not intended to be limiting; but rather, to provide an understandable description of the invention. It is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the tether, spanning to and from the first and second ends.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION OF INVENTION

Figure 1:
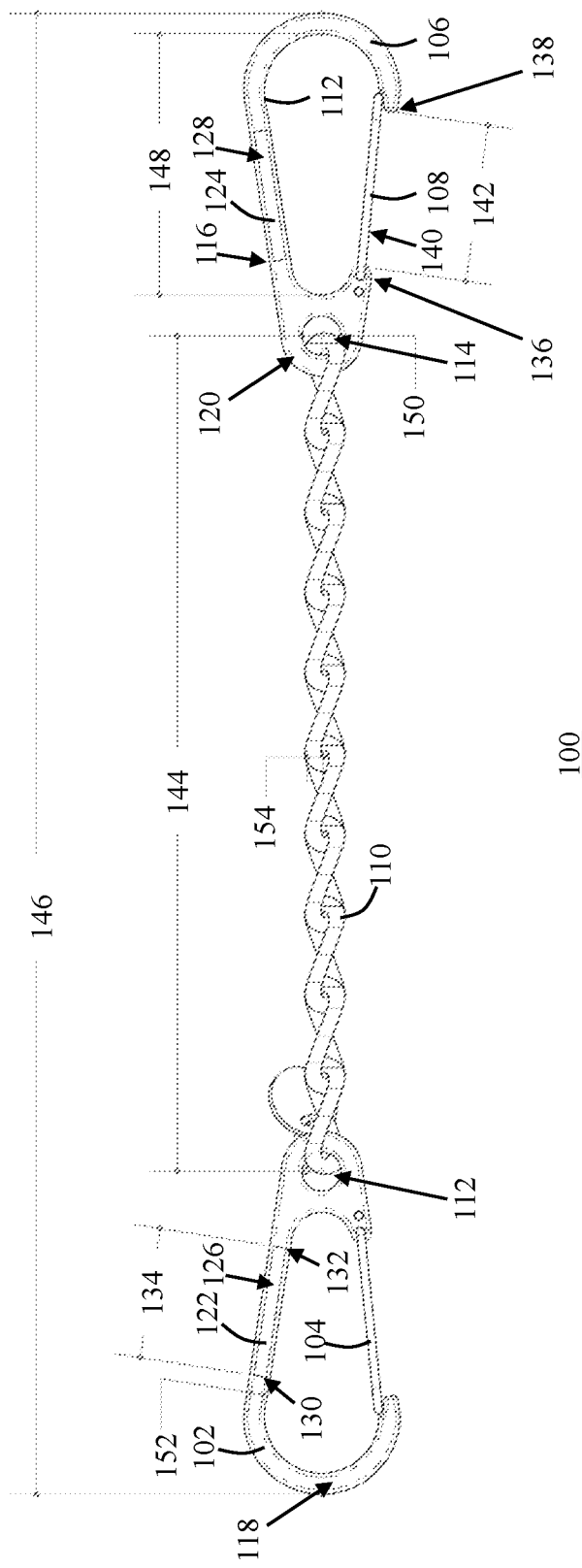
FIG. 1 is an elevational right-side view of a personal item security tether and fastening assembly in accordance with one embodiment of the present invention.
Figure 5:
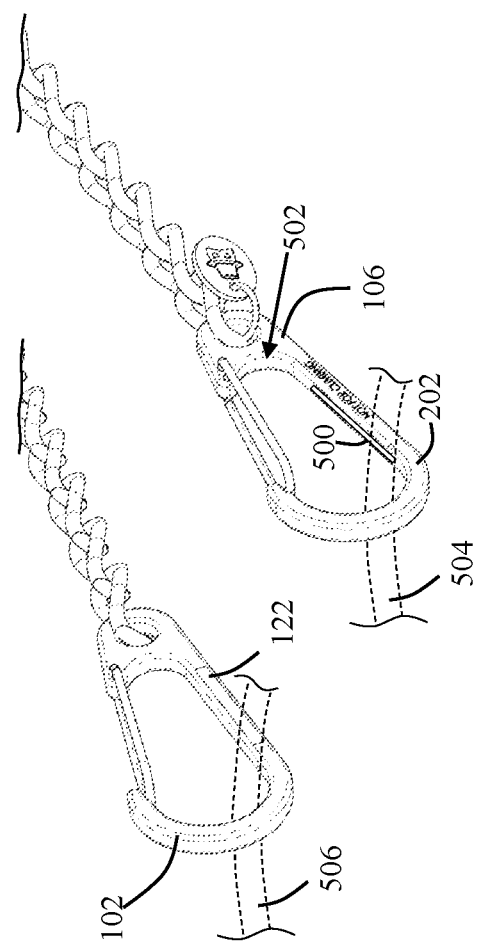
FIG. 5 is a fragmentary perspective view of a personal item security tether and fastening assembly in accordance with one embodiment of the present invention.

With reference briefly to FIG. 1 and FIG. 5, the invention described herein provides a personal item security tether and fastening assembly 100 that overcomes known disadvantages of those known devices and methods of this general type and that includes a first end operably configured to effectively and efficiently removably couple to a personal item, e.g., a purse, backpack, etc. (representatively shown in FIG. 5 with numeral 504), and a second end, opposite the first end, operably configured to efficiently and efficiently removably couple to an anchoring body, e.g., a table, a chair leg, a shopping cart, etc. (representatively shown in FIG. 5 with numeral 506).

Figures 2, 3:
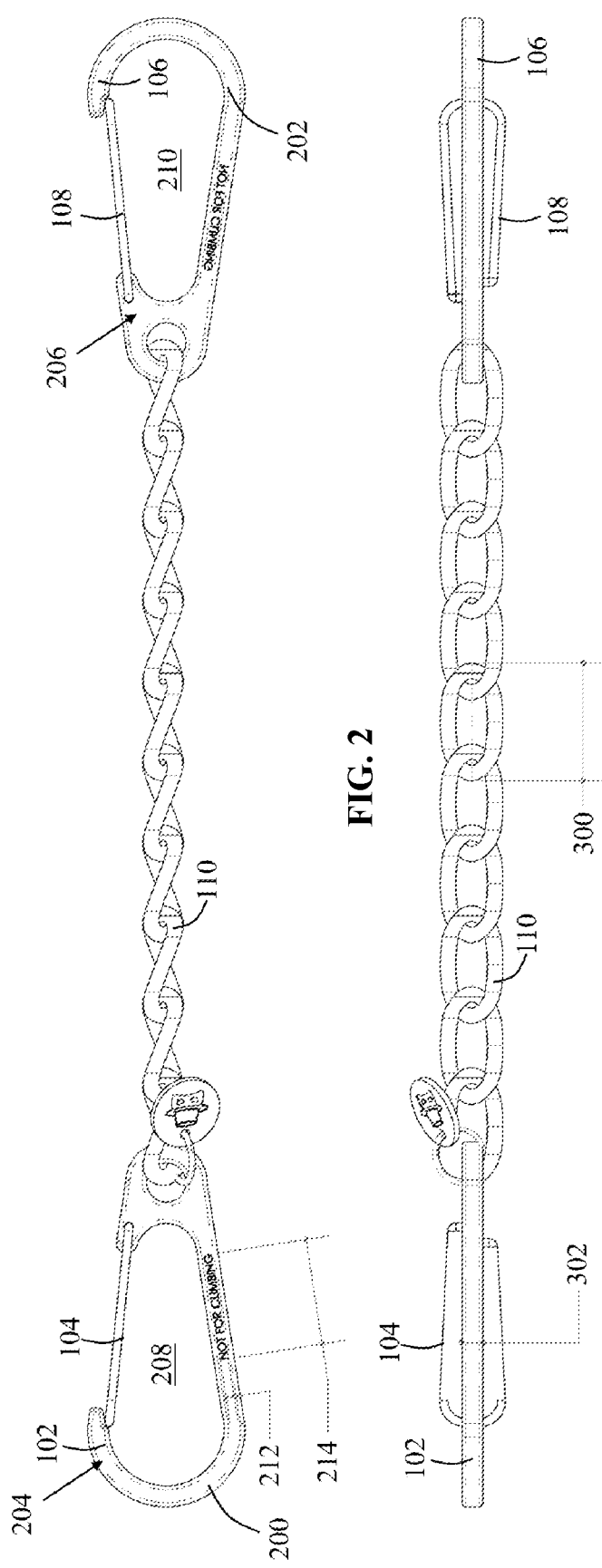
FIG. 2 is an elevational left-side view of the personal item security tether and fastening assembly in FIG. 1.
FIG. 3 is a top plan view of the personal item security tether and fastening assembly in FIG. 1.

Referring now to FIGS. 1-3, one embodiment of the present invention is shown various views. FIGS. 1-3 show several advantageous features of the present invention, but, as will be described below, the invention can be provided in several shapes, sizes, combinations of features and components, and varying numbers and functions of the components. The first example of a personal item security tether and fastening assembly 100, as shown in FIGS. 1-3, includes a first fastener 102 with a spring-loaded displaceable clip 104, a second fastener 106 with a spring-loaded displaceable clip 108, and a substantially rigid (or "rigid") tether 110 with a first end 112 and a second end directly 114 coupled to the first and second fasteners 102, 106, respectively.

More specifically, the first fastener 102 includes a sidewall 200 of a rigid material, e.g., stainless steel, and having an outer sidewall surface 118 at least partially defined by an outer surface 126 of a magnet 122 of a first polarity and integrally coupled to and within the sidewall 200 of the first fastener 102. The first fastener 102 includes an inner sidewall surface 204 opposing the outer sidewall surface 118, wherein both surfaces 204, 206 (as represented on the second fastener 106) may span continuously around the fastener 102 until reaching ends 136, 138 that define a fastener opening 140 (ranging approximately 1-2 inches). The spring-loaded displaceable clip member 104 is rotatably coupled to the sidewall 200 of the first fastener 102 and operably configured to completely enclose, with the sidewall 200 of the first fastener 102, a first retention aperture 208. The displaceable clip member 104 is also of a rigid material (e.g., stainless steel) to resist pull forces ranging from 50-200 lbf.

The second fastener 106 includes the same functionality and features as the first fastener 102, including a sidewall 202 of a rigid material and having an outer sidewall surface 120 at least partially defined by an outer surface 128 of a magnet 124 of a second polarity opposite the first polarity of the magnet 122 coupled to the first fastener 102 and integrally coupled to and within the sidewall 202 of the second fastener 106. As such, the opposite polarities of the first and second magnets 122, 124 enable the two fasteners 102, 104 to beneficially and selectively couple and uncouple to each other, magnetically, when not desired for use. The inner sidewall surface 206 of the second fastener 106 opposes the outer sidewall surface 120. The spring-loaded displaceable clip member 108 is also rotatably coupled to the sidewall 202 of the second fastener 106 and is operably configured to completely enclose, with the sidewall 202 of the second fastener 106, a second retention aperture 210. The sidewall thicknesses 152, 302 may be approximately 0.1 inches. The sidewalls 200, 202 may also include information inscribed thereon of a thickness 212 and a length 214 to inform the user of information needed to use the device.

A tether member 110 is also of a rigid material (e.g., stainless steel) with a first terminal end 112 fixedly coupled to the first fastener 102 and with a second terminal end 114, opposing the first terminal end 112, fixedly coupled to the second fastener 106. Said another way, the tether member 110 is composed of rigid links (each having a thickness of approximately 0.15 inches) that join together and enable flexibility between the fasteners 102, 106. A portion of the rigid links surround a portion of the fastener proximal to an end, and may be disposed within an aperture 150 of a diameter of approximately 0.25-0.75 inches. In other embodiments, the tether member 110 is mechanically coupled to the fastener using another fastener or welding. In one embodiment, the substantially rigid tether 110 may be of a chain link and metallic material, such as stainless steel, or a polymeric material, such as PVC, but should be of a material property and configuration sufficient to resist a tensile force of at least approximately 25-200 lbf. In other embodiments, the substantially rigid tether 110 may be of a cable configuration. Each of the ends 112, 114 of the tether member 110 are directly coupled to the fasteners 102, 106. As shown in FIG. 3, each of the links may be approximately 1-1.5 inches in length 300. The tether member 110 may be of a length 144 of approximately 7-8 inches, wherein the overall length 146 separating the terminal ends of the assembly may be approximately 13-15 inches.

Each of the spring-loaded clip members 104, 108 may be operably configured to be biased in a closed position preventing a portion of a personal item fastened inside of the fastener from being removed therefrom. The clip member 104, 108 have a path with at least one position prevented from rotational movement (e.g., with a portion of the sidewall—as shown in the figures) and a position allowing entrance of the portion of the personal item into the opening 140 and apertures 208 defined by the respective fasteners 102, 106. The aperture length (e.g., length 148) is approximately 2-3 inches (as shown in FIG. 1). Exemplary and preferred dimensions of the assembly are depicted herein in order to effectively permit a user to keep the personal item close to the structure retained with the tether assembly 100.

The magnets 122, 124 are preferably of a permanent magnetic material (e.g., neodymium) operably configured to selectively removably couple with an opposing fastener. In one embodiment, the magnets 122, 124 each have two opposing terminal ends 130, 132 and a magnet length 134 separating the two opposing terminal ends 130, 132, wherein the outer surfaces 126, 128 of the magnets 122, 124 are substantially planar (thereby providing a continuous contacting portion between them). In one embodiment, the magnets 122, 124 are only disposed on a portion (e.g., portion 116) of the fastener. In other embodiments, the fasteners 102, 106 may be made completely of a magnetic material. Magnetic force generated by the magnets 122, 124 should be sufficient to at least retain the weight of an opposing fastener.

Figure 4:
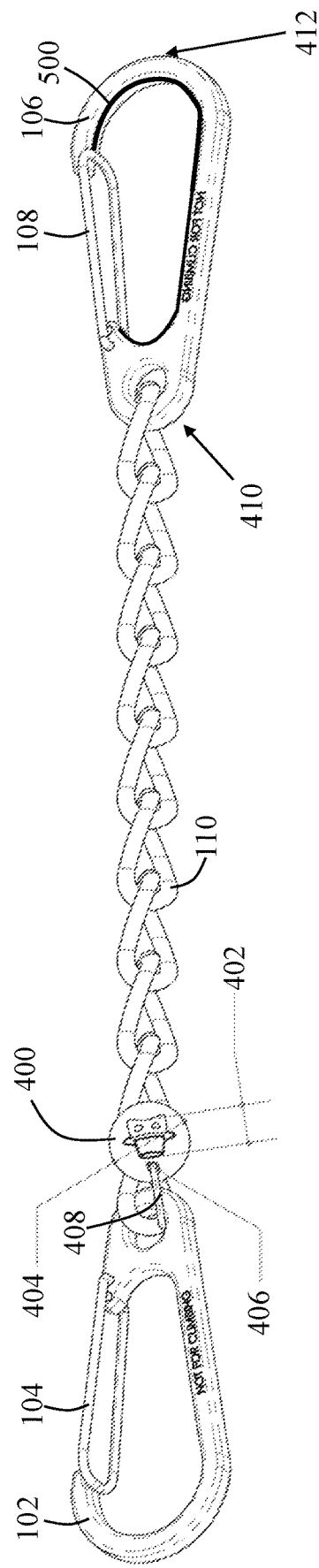
FIG. 4 is a perspective view of the personal item security tether and fastening assembly in FIG. 1.

In one embodiment and with reference to FIGS. 1-2 and FIG. 4, the outer surfaces 126, 128 of the magnets 122, 124 coupled to the respective first and second fasteners 102, 106 are flush with the outer sidewall surfaces of the respective first and second fasteners 102, 106 to which they are coupled, thereby beneficially saving space when the tether assembly 100 is stored. In another embodiment, the outer surfaces 126, 128 of the magnets 122, 124 protrude a distance away from the outer surfaces 118, 120 of the sidewall 200 at least a distance in which the displaceable clip member 104 protrudes away from the outer surfaces 118, 120 of the sidewall 200. In one embodiment, the magnets 122, 124 are respectively disposed on a single side of the first and second fasteners 102, 106 (as shown in the figures), while in other embodiments, the magnets 122, 124 are disposed (in some instances symmetrically) on opposite sides of each of the fasteners 102, 106. The magnets 122, 124 may consist of one single bar magnet, or may be part of a collective group of magnets.

The first and second fasteners 102, 106 may also each have a length separating two opposing ends 410, 412 of the first and second fasteners 102, 106, respectively, wherein the outer surfaces 126, 128 of the magnets 122, 124 coupled to the respective first and second fasteners 102, 106 is at least 50% of the length separating two opposing ends 410, 412 of the first and second fasteners 102, 106, respectively. The length of the magnets 122, 124 also facilitates in maintaining a secure connection between the fasteners 102, 106 when coupled together.

Therefore, when desired for use by the user, the user will couple the first fastener 102 to a personal item, e.g., a purse handle (e.g., 504). The user will then place the second fastener 106 to a structure, e.g., a shopping cart handle (e.g., 506). As such, the personal item will be safely and securely tethered to the structure and can be removed by the user when desired (thereby preventing and/or deterring theft of the personal item). In additional embodiments, each of the fasteners may include a locking mechanism configured to selectively close and open the clip member of each fastener. In embodiment, the locking mechanism may be biometrically configured with the user to open and close the clip member, e.g., using a fingerprint. When the user desires to put the tether assembly 100 away, the user will selectively orient the magnets 122, 124 toward one another (as depicted best in FIG. 5) and then couple the fasteners 102, 106 together using said magnets 122, 124. In one embodiment and using fastener 106 as an example as depicted in FIGS. 4-5, the fasteners 102, 106 include a deformably resilient material 500, e.g., rubber, lined along the entire (FIG. 4) or partial (FIG. 5) inner surface 502 of the sidewall 202 to prevent damage to the items they are retaining. More specifically, the inner surface 502 of the sidewall 202 are lined with a deformably resilient material where force is going to be applied, e.g., one or more opposing side curved portions of the inner surface 502, or where the personal belongings/items are touching the fastener, e.g., the deformably resilient material will be lined on at least one of the two opposing curved portions and the deformably resilient material is configured to prevent damage to the personal item in a longitudinal direction of force applied to the tether member.

With reference to FIG. 4, one embodiment of the present invention includes the assembly 100 will include a tag 400 of a rigid material and having a logo, personal identifying information of the user, or other information with a length 402 of approximately 0.1-0.5 inches, an overall diameter 404 of approximately 0.2-0.8 inches, and an aperture diameter 406 defined by the tag 400 of approximately 0.1 inches. The tag 400 beneficially includes a rigid ring 408 coupling the tag 400 to the aperture defined by the fastener.

Although a specific order of executing the process steps has been described herein, the order of executing the steps may be changed relative to the order shown in certain embodiments. Also, two or more steps shown in succession may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A personal item security tether and fastening assembly comprising:
   a first fastener with two opposing ends, with a sidewall of a rigid material and having an outer sidewall surface at least partially defined by an outer surface of a magnet of a first polarity and integrally coupled to and within the sidewall of the first fastener and an inner sidewall surface opposing the outer sidewall surface and with two opposing curved portions and having a deformably resilient material lined on at least one of the two opposing curved portions of the inner sidewall surface, and defining an aperture disposed proximal to one of the opposing ends of the first fastener and interposing a first retention aperture, a spring-loaded displaceable clip member rotatably coupled to the sidewall of the first fastener and operably configured to completely enclose, with the sidewall of the first fastener, the first retention aperture, the first fastener operably configured to selectively removably couple to a personal item with the deformably resilient material configured to touch the personal item;
   a second fastener with two opposing ends, with a sidewall of a rigid material and having an outer sidewall surface at least partially defined by an outer surface of a magnet of a second polarity opposite the first polarity of the magnet coupled to the first fastener and integrally coupled to and within the sidewall of the second fastener and an inner sidewall surface opposing the outer sidewall surface, and defining an aperture disposed proximal to one of the opposing ends of the second fastener and interposing a first retention aperture, a spring-loaded displaceable clip member rotatably coupled to the sidewall of the second fastener and operably configured to completely enclose, with the sidewall of the second fastener, a second retention aperture, the second fastener operably configured to selectively removably couple to an anchoring body; and a tether member of a rigid material, with a first terminal end fixedly coupled to the first fastener and disposed within the aperture of the first fastener, and with a second terminal end, opposing the first terminal end, fixedly coupled to the second fastener and disposed within the aperture of the second fastener, the tether member attaching the personal item to the anchoring body together and the deformably resilient material configured to prevent damage to the personal item in a longitudinal direction of force applied to the tether member.

2. The personal item security tether and fastening assembly according to claim 1, wherein the magnets each further comprise:

two opposing terminal ends and a magnet length separating the two opposing terminal ends, wherein the outer surfaces of the magnets are substantially planar.

3. The personal item security tether and fastening assembly according to claim 2, wherein:

wherein the outer surfaces of the magnets coupled to the respective first and second fasteners are flush with the outer sidewall surfaces of the respective first and second fasteners to which they are coupled.

4. The personal item security tether and fastening assembly according to claim 2, wherein the first and second fasteners each further comprise:

a length separating two opposing ends of the first and second fasteners, respectively, wherein the outer surfaces of the magnets coupled to the respective first and second fasteners is at least 50% of the length separating two opposing ends of the first and second fasteners, respectively.

5. The personal item security tether and fastening assembly according to claim 4, wherein:

the magnets are respectively disposed on a single side of the first and second fasteners.

6. The personal item security tether and fastening assembly according to claim 1, wherein:

the rigid tether member is comprised of steel chain.

7. The personal item security tether and fastening assembly according to claim 1, wherein:

the rigid tether member is less than 12 inches.

8. The personal item security tether and fastening assembly according to claim 1, wherein:

the magnets are respectively disposed on a single side of the first and second fasteners.

9. The personal item security tether and fastening assembly according to claim 1, wherein at least one of the first and second fasteners further comprise:

the deformably resilient material is lined along the entire inner surface of the sidewall.

* * * * *